3,019,241
PROCESS FOR THE PREPARATION OF ENOL-ETHERS OF Δ⁴-3-KETOSTEROIDS
Alberto Ercoli, Via Circo 12, Milan, Italy
No Drawing. Filed May 4, 1960, Ser. No. 26,711
Claims priority, application Germany May 4, 1959
11 Claims. (Cl. 260—397.4)

The present invention is concerned with a process for the preparation of enolethers of Δ⁴-3-ketosteroids of the pregnane and androstane series illustrated by the formula:

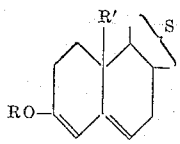

where S completes the steroid nucleus, R' represents methyl or hydrogen and R represents a higher aliphatic or cycloaliphatic hydrocarbon radical, a lower aliphatic hydrocarbon radical having a functional substituent other than a hydroxyl group or also an aryl radical.

More particularly this invention is concerned with the preparation of alkyl and cycloalkyl enolethers of physiologically active Δ⁴-3-ketosteroids such as, for instance, 17α-methyl-testosterone, progesterone, 17α-hydroxy-and acetoxyprogesterone, cortisone and hydrocortisone, 19-nortestosterone and 17α-alkyl and alkynyl derivatives thereof.

It is an object of the present invention to provide a new process for preparing enolethers of Δ⁴-3-ketosteroids, particularly enolethers of the above formula. Another object of this invention is to provide alkyl and cycloalkyl enolethers of physiologically active steroids, which compounds possess important biological properties and are exeremely active on oral administration.

The process of this invention comprises treating a lower alkyl enolether, such as, for instance, the ethyl enolether, previously formed, of a Δ⁴-3-ketosteroid with an alcohol (or phenol) of the formula ROH (where R has the meaning defined above), in the presence of an acid catalyst and in solution in an organic solvent. By direct exchange, the desired new enolether is formed, while the aliphatic alcohol (in the particular case ethyl alcohol) which has been set free during the said exchange reaction, can be eliminated from the reaction mixture by direct distillation.

The alcohol chosen for the reaction may be a straight or branched chain, primary or secondary or tertiary aliphatic alcohol, excepting, of course, ethyl alcohol. Also a lower aliphatic alcohol, substituted with other functional groups such as halogen atoms, alkoxy, carboxy or carbalkoxy groups may be employed. Moreover, a cycloaliphatic alcohol, in particular cyclopentanol or cyclohexanol, or also a phenol can be used, if desired. In general, it may be stated that the exchange reaction will occur with any organic compound containing a hydroxy group of an alcoholic or phenolic nature, it being understood, as pointed out above, that the compound may contain functional substituents in addition to the hydroxy group.

The acid catalyst required to bring about the exchange reaction can be any of the acids usually employed for the formation of enolethers. Suitable catalyst are the aromatic sulphonic acids, such as toluene, benzene, naphthalene or anthraquinone sulfonic acids as well as Lewis acids such as $SnCl_4$ or $SbCl_5$. Salts of organic bases with mineral acids, such as, for instance, pyridine hydrochloride can be also employed as catalyst.

The exchange reaction is preferably carried out in an organic solvent which is substantially non-polar. Solvents such as benzene and its homologues, cyclohexane, isooctane, tetrahydrofuran or dioxan can be advantageously employed. Halogenated organic solvents, such as ethylene bromide, chloroform or tetrachlorethane may be also employed, alone or in admixture with one of the above-mentioned solvents.

The reaction mixture, constituted by the preformed ethyl enolether of a Δ⁴-3-ketone (suspended or dissolved in one of the above-mentioned solvents), the desired alcohol (or phenol) and the acid catalyst, is heated to boiling with an ascending or descending condenser. In the latter case some liquid is distilled off at ordinary pressure so that the ethanol which forms during the exchange reaction is removed.

The distillation period depends, of course, on the volume of the solvent employed and the amount of ethyl enol ether to be reacted. It is advisable to eliminate by distillation at least ⅔ of the starting volume of the solution to insure the complete elimination of the ethyl alcohol from the reaction mixture.

The remaining solution is then made slightly alkaline by addition of a weak organic base, such as pyridine, or an alkaline hydroxide or carbonate and is evaporated to small bulk or dryness in vacuo. The crystallization of the resulting enolether contained in the residue can be suitably facilitated by adding ether, methyl or ethyl alcohol or hexane or solvents of this type.

Obviously, the enolether thus obtained may be submitted to a normal acylation, saponification or condensation reaction in order to obtain the desired end product.

The process according to the present invention permits the obtaining of the desired compounds when, by conventional methods, the results are not satisfactory, as, for instance when higher alkyl enolethers such as amyl, hexyl, heptyl, etc. or substituted alkyl ethers, such as chloralkyl and carbalkoxyalkyl enolethers are to be prepared. It also improves remarkably the yields obtained in the preparation of cyclo enol ethers in which case the direct method of enoletherification leads to generally satisfactory results.

Moreover, the process of the present invention has the advantage of shortening remarkably the reaction period. Instead of the 15-20 hours required by the conventional methods, only a few hours, at the most, are required to transform the Δ⁴-3-ketone first into the ethyl enolether and then into the corresponding desired enolether.

Amongst the advantages offered by the present invention, it will be noted that it is not absolutely necessary to start from a pure ethyl enolether obtained by conventional procedures and then subjected to a suitable purification, one can, if desired, employ the reaction medium, itself, containing the ethyl enolether, e.g. as obtained by interaction of the Δ⁴-3-ketone with ethyl orthoformate.

Accordingly, when the ethyl enolether in the pure state is not available, a preferred embodiment of the invention comprises treating, at room temperature, the Δ⁴-3-ketone with ethyl orthoformate and ethyl alcohol and then reacting the mixture so formed with the desired alcohol, in the presence, of course, of an acid catalyst and a non-polar solvent.

The reaction carried out as above gives yields of enol ether even superior to those obtained by starting from a pure 3-ethyl enolether.

Many of the enolethers described in the following examples exhibit particularly interesting biological properties. For instance, the alkyl and cycloalkyl enolethers of 17α-methyltestosterone, which are obtained from the corresponding enol ethers of androstenedione by treatment with methyl magnesium halide Grignard reagent, possess, when given by oral route, androgenic and anabolic properties clearly superior to those of the free ketone.

Analogously, the alkyl and cycloalkyl enolethers of progesterone and 17α-hydroxy and acetoxy progesterone show, by oral route, an exceptional progestational activity higher than that of the corresponding free hormones. The same also is true of the enolethers of 17α-ethynyl 19-nortestosterone.

Analogously, enolethers of cortisone and hydrocortisone show hormonal properties materially different from and superior to those of the free ketones. When they are given by parenteral route, they seem to be devoid of the reducing activity on granulation tissue which is a characteristic of cortisone and hydrocortisone. When given by oral route, they show, on the contrary, a glucocorticoid and anti-inflammatory activity higher than that of the free hormones and almost equal to that of prednisone and prednisolone.

As contrasted with methyltestosterone, the enolethers of testosterone, given subcutaneously, do not possess the typical androgenic activity of the free ketone, and for this reason are more useful than the free ketones when therapeutic treatment with these last-mentioned compounds would be indicated and no masculinizing activity is desired.

As to the enolethers of 19-nortestosterone, it has been found that they are substantially devoid of androgenic properties, while they maintain, almost unaltered, the anabolic properties of the starting ketone.

In order that the invention may be well understood the following examples are given by way of illustration only:

EXAMPLE 1

A. 14 g. of ethyl enolether of androstenedione, melting at 149–151° C. (obtained in a yield of 85% of the theoretical amount by treating androstenedione with ethyl orthoformate), were added to a boiling solution of 37 cc. of cyclohexanol and 0.450 g. of p-toluenesulfonic acid in 2.5 l. of benzene. The mixture was distilled over an approximately 40 minute period, so that the ethanol which evolved during the exchange reaction was evaporated off completely.

Then 0.5 cc. of pyridine were added to the remaining solution and the mixture was concentrated under vacuum to dryness. The residue, taken up with a mixture of methanol-methylene chloride containing a few drops of pyridine, gave 13.8 g. of cyclohexyl enolether of androstenedione melting at 163–165° C. Yield about 85%.

When cyclohexyl enolether of androstenedione is prepared by direct treatment of the free androstenedione with cyclohexanol, the yield in pure product, under the most favorable conditions, are not over 65% of the theoretical amount.

B. The cyclohexyl enolether of androstenedione was converted to the corresponding cyclohexyl enolether of 17α-methyl testosterone as follows:

In a 3-necked flask fitted with a dropping funnel, reflux condenser, stirrer and nitrogen inlet tube, there was placed a solution of 25 g. of methyl magnesium bromide in 150 cc. of ether. With stirring and under an atmosphere of nitrogen, a solution of 4.1 g. of androstenedione 3-cyclohexyl enolether in 80 cc. of anhydrous benzene was added slowly. The reaction mixture was refluxed for 1 hour and allowed to stand overnight at room temperature. The mixture was then treated with an aqueous solution of 30% ammonium chloride, the organic layer separated off, washed with water and dried over anhydrous sodium sulfate. The solvent was evaporated and the residue taken up with dilute methanol to yield 3.2 g. of a white product. Crystallization from methanol containing few drops of pyridine give the pure 17α-methyltestosterone 3-cyclohexyl enolether at melting point 142–144° C.; $[\alpha]_D = -136°$ (dioxan).

EXAMPLE 2

By reacting 3-ethyl enolether of androstenedione with the appropriate alcohol in benzene solution according to the procedure described in Example 1, part A, the following enolethers of androstenedione were prepared:

Table 1

| enolethers of androstenedione | M.P., ° C. | $[\alpha]_D$ (in dioxan) |
|---|---|---|
| Isobutyl | 144–147 | −77.5 |
| sec. butyl | 132–134.5 | −81 |
| n. amyl | 104–106 | −76 |
| isoamyl | 113–115 | −71.5 |
| n. hexyl | 85–87 | −73 |
| (2-methyl)-pentyl | 87–90 | −69 |
| (4-methyl)-pentyl | 119–121 | −67 |
| (2-ethyl)-butyl | 83–85 | −65.6 |
| (1,3-dimethyl)-butyl | 122–124 | −84 |
| n. heptyl | 66–67 | −71 |
| 4-chlorobutyl | 108–111 | −66 |
| cyclopentyl | 181–183 | −88.5 |
| phenyl | 140–143 | −67 |

These compounds were then reacted with methyl magnesium bromide, according to the procedure described in Example 1, part B, and converted to the corresponding 17α-methyltestosterone 3-enol ethers:

Table 2

| 3-enol ethers of 17α-methyltestosterone | M.P., ° C. | $[\alpha]_D$ (in dioxan) |
|---|---|---|
| Isobutyl | 128–130 | −139 |
| sec. butyl | 131–134 | −145 |
| n. amyl | 96–98 | −134.5 |
| isoamyl | 121–125 | −134 |
| n. hexyl | 79–81 | −131 |
| (2-methyl)-pentyl | 85–89 | −120 |
| (4-methyl)-pentyl | 102–103 | −134 |
| (2-ethyl)-butyl | 106–107 | −129.5 |
| (1,3-dimethyl)-butyl | 113–115 | −135 |
| n. heptyl | 62–64 | −123.5 |
| (4-chloro)-butyl | 90–93 | −110 |
| cyclopentyl | 148–152 | −150 |
| phenyl | 149–151 | −140 |

EXAMPLE 3

To a mixture of 600 cc. of anhydrous benzene and 6 cc. of n-hexyl alcohol, 0.15 g. of p-toluenesulfonic acid were added. A portion of the solvent was distilled off, in order to remove azeotropically any possible trace of moisture. To the remaining mixture 3 g. of 3-ethyl enolether of testosterone phenylpropionate were added (M.P. 107–108° C.) and distillation was continued for a further 30 minutes so that the ethyl alcohol was distilled off completely.

0.5 cc. of pyridine were added to the residual solution and the liquid was evaporated to dryness in vacuo. The residue was taken up with ether, filtered, dried and then recrystallized from methanol containing a trace of pyridine. The n-hexyl enolether of testosterone phenylpropionate melts at 85–86° C.; $[\alpha]_D = -89°$ C. (1% in dioxan). The yield is superior to 90% of the theoretical amount.

By operating as illustrated above, the following enol-ethers of free or esterified testosterone were obtained:

Table 3

|  | M.P., °C. | $[\alpha]_D$ (dioxan) |
|---|---|---|
| n. butyl enolether of testosterone | 93–96 | −123.5 |
| isobutyl enolether of testosterone | 118–120 | −122 |
| sec. butyl enolether of testosterone | 109–112 | −133.5 |
| n. amyl enolether of testosterone | 104–106 | −120 |
| isoamyl enolether of testosterone | 107–109 | −117 |
| n. hexyl enolether of testosterone | 109–112 | −114 |
| (2-methyl)-pentyl enolether of testosterone | 106–109.5 | −115 |
| n. heptyl enolether of testosterone | 89–91 | −111 |
| n. octyl enolether of testosterone | 78–79 | −111 |
| n. decyl enolether of testosterone | 71–73 | −105 |
| cyclohexyl enolether of testosterone formate | 133–137.5 | −149 |
| n. heptyl enolether of testosterone acetate | 127.5–129 | −120 |
| (carbethoxy)-methyl enolether of testosterone acetate | 120–121 | −120 |
| (carbethoxy)-ethyl enolether of testosterone acetate | 156–159 | −73 |
| sec. butyl enolether of testosterone propionate | 130–132 | −130 |
| tert. amyl enolether of testosterone propionate | 122–125 | −120 |
| n. hexyl enolether of testosterone propionate | 110–112 | −115 |
| (2-ethyl)-butyl enolether of testosterone propionate | 102–104 | −20 |
| (2-chloro)-ethyl enolether of testosterone propionate | 148–150 | −125 |
| (carbomethoxy)-methyl enolether of testosterone propionate | 103–105 | −121 |
| cyclohexyl enolether of testosterone propionate | 140–143 | −123 |
| phenyl enolether of testosterone propionate | 101–103 | −132 |
| cyclohexyl enolether of testosterone valerate | 127–129 | −117 |
| n. hexyl enolether of testosterone oenanthate | 71.5–72.5 | −96 |
| n. heptyl enolether of testosterone oenanthate | 64–66 | −95 |
| cyclohexyl enolether of testosterone oenanthate | 111–113 | −104 |
| m. nitrobenzyl enolether of testosterone oenanthate | 119.5–120.5 | −73 |
| cyclohexyl enolether of testosterone phenylpropionate | 135–136 | −92.5 |

EXAMPLE 4

To a solution of 500 mg. of 19-nortestosterone propionate in one cc. of tetrahydrofuran were added 0.5 cc. of ethyl orthoformate, 0.27 cc. of ethyl alcohol and 5 mg. of p-toluenesulfonic acid. The reaction mixture was allowed to stand at room temperature (about 20° C.) for 45 minutes, then poured in boiling benzene (80 cc.) containing 3 cc. of cyclohexanol. The resulting mixture was processed as in Example 1, part A, to give 3-cyclohexyl enolether of 19-nortestosterone propionate, melting at 124–126° C.; $[\alpha]_D = -135$ (dioxan). Yield 72% of the theoretical amount.

In the same manner as above, other representative enol-ethers of 19-nortestosterone and 17α-ethynyl derivatives thereof were prepared, including the following ones:

Table 4

|  | M.P., °C. | $[\alpha]_D$ (in dioxan) |
|---|---|---|
| n. butyl enolether of 19-nortestosterone acetate | 128.5–131 | −136.5 |
| n. amyl enolether of 19-nortestosterone acetate | 75.5–78 | −140 |
| n. heptyl enolether of 19-nortestosterone acetate | 64.5–65.5 | −135.5 |
| cyclopentyl enolether of 17 α-ethynyl-19-nortestosterone acetate | 180–183 | −212 |
| amyl enolether of 17 α-ethynyl-19-nortestosterone acetate | 108–110 | −194 |
| n. heptyl enolether of 17 α-ethynyl-19-nortestosterone acetate | 38–40 | −153 |

Similarly, there is prepared the butyl enol ether of 17α-methyl 19-nortestosterone, the hexyl enol ether of 17α-methyl 19-nortestosterone acetate and the cyclohexyl enol ether of 17α-methyl 19-nortestosterone.

EXAMPLE 5

8 cc. of ethyl orthoformate and 80 mg. of benzensulfonic acid were added to a solution of 6 g. of cortisone acetate in 50 cc. of anhydrous benzene. After approximately 10 minutes 800 cc. of anhydrous benzene and 18 cc. of ethylene chlorohydrin were added and the resulting solution was heated and distilled to ⅔ of the starting volume. To the residual solution a few drops of pyridine were added and the liquid was evaporated in vacuo. The residue crystallized from methanol containing a small amount of pyridine gave (2-chloro)ethyl enolether of cortisone acetate; M.P. 176–178° C.; $[\alpha]_D = +20°$ (dioxan).

In a similar manner, the corresponding (2-chloro)ethyl enolether of hydrocortisone acetate was obtained. Similarly the following enolethers of free and esterified cortisone were prepared.

Table 5

|  | M.P., °C. | $[\alpha]_D$ (in dioxan) |
|---|---|---|
| n. amyl enolether of cortisone | 149–152 | −18.2 |
| cyclopentyl enolether of cortisone | 179–180 | −38 |
| n. hexyl enolether of cortisone | 139–141 | −18.4 |
| n. heptyl enolether of cortisone | 129–135 | −17.5 |
| n. butyl enolether of cortisone acetate | 152–155 | +17.8 |
| (2-methoxy)-ethyl enolether of cortisone acetate | 134–137 | +37.5 |
| sec. butyl enolether of cortisone acetate | 187–192 | +20.5 |
| carbomethoxy-methyl enolether of cortisone acetate | 190–192 | +22.5 |
| n. amyl enolether of cortisone acetate | 151–152.5 | +17.7 |
| cyclopentyl enolether of cortisone acetate | 176–178 | +10 |
| n. heptyl enolether of cortisone acetate | 141.5–143.5 | +17.1 |

By a similar procedure, the corresponding enolethers of hydrocortisone acetate were prepared.

EXAMPLE 6

3 g. of ethyl enolether of progesterone in 50 cc. of anhydrous tetrahydrofuran were treated with 60 mg. of sulfosalicylic acid and 5 cc. of n.amyl alcohol. The mixture was heated and distilled in order to reduce the total volume of the solution to about ¼. Then a few drops of pyridine were added and the solvent was completely removed in vacuo. The residue was taken up with dilute methanol, filtered and dried to give n.amyl enolether of progesterone, M.P. 65.5–68° C., $[\alpha]_D = -49$ (dioxan).

In a similar manner, other enolethers of progesterone and 17α-hydroxy and acetoxy progesterone were obtained.

Table 6

|  | M.P., °C. | $[\alpha]_D$ (in dioxan) |
|---|---|---|
| n. butyl enolether of progesterone | 70–71 | −43 |
| (4-methyl)-pentyl enolether of progesterone | 100–102 | −47 |
| n. hexyl enolether of progesterone | 73–75 | +22 |
| n. heptyl enolether of progesterone | 61–63 | −44 |
| cyclopentyl enolether of progesterone | 105–106 | −47.5 |
| cyclohexyl enolether of progesterone | 115–116.5 | −52.5 |
| (4-methyl)-pentyl enolether of 17 α-acetoxy progesterone | 154–156 | −142.5 |
| n. amyl enolether of 17 α-acetoxy progesterone | 125–126 | −126.5 |
| n. hexyl enolether of 17 α-acetoxy progesterone | 93–94 | −124 |
| n. heptyl enolether of 17 α-acetoxy progesterone | 59–62 | −124 |
| cyclohexyl enolether of 17 α-acetoxy progesterone | 162–164 | −131 |
| cyclopentyl enolether of 17 α-acetoxy progesterone | 137–138 | −147 |
| cyclohex-2-enyl enolether of 17 α-acetoxy progesterone | 154–156.5 | −145.5 |
| cyclopentyl enolether of 17 α-hydroxy progesterone | 184.5–186.5 | −115 |
| n. amyl enolether of 17 α-hydroxy progesterone | 102–104 | −95+1 |

The present invention has been described, particularly with respect to the use of ethyl enol ethers as the starting materials since they can be obtained with good yield using inexpensive reagents. It will be understood, of course, that one could obviously, if desired, start with another lower alkyl enol ether, for example, the methyl enol ethers.

I claim:

1. A process for the preparation of enolethers of Δ⁴-3-ketosteroids selected from the group consisting of steroids of the androstane and pregnane series, which comprises reacting in a substantially non-polar organic solvent the ethyl enolether of said Δ⁴-3-ketosteroid with a compound having the formula ROH in which R is a radical exchangeable for the ethyl group of the starting enolether and is a member selected from the group consisting of an aliphatic hydrocarbon radical containing more than two and not more than ten carbon atoms, a cycloaliphatic hydrocarbon radical, a lower aliphatic hydrocarbon radical containing a functional group selected from the group consisting of halo and carbalkoxy groups and an aryl radical in the presence of an acid enoletherification catalyst and thereafter recovering the resulting enolether from the reaction mixture.

2. A process as claimed in claim 1 in which the acid catalyst is a member selected from the group consisting of a sulfonic acid, a Lewis acid and pyridine hydrochloride.

3. A process as claimed in claim 1 in which the organic solvent is a member selected from the group consisting of benzene, a homologue thereof, cyclohexane, isooctane, tetrahydrofuran, dioxan and halogenated hydrocarbons.

4. A process as claimed in claim 1 in which the starting ethyl enol ether of the $\Delta^4$-3-ketosteroid is formed by reacting at room temperature the corresponding $\Delta^4$-3-ketone with ethyl orthoformate in the presence of anhydrous ethanol.

5. A process as claimed in claim 1 in which the starting compound is the ethyl enolether of androstenedione and the resulting enolether of androstenedione is reacted with methyl magnesium bromide Grignard reagent and thus converted to the corresponding enolether of 17α-methyltestosterone.

6. A process as claimed in claim 1 in which the starting ethyl enolether of said $\Delta^4$-3-ketosteroid is the ethyl enolether of androstenedione.

7. A process as claimed in claim 1 in which the starting enolether of said $\Delta^4$-3-ketosteroid has the formula:

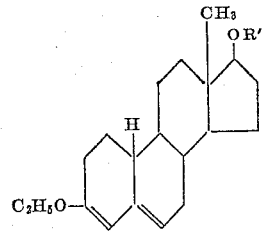

where $R^1$ is a member selected from the group consisting of hydrogen and an acyl group derived from a lower alkanoic acid.

8. A process as claimed in claim 1 in which the starting enolether of said $\Delta^4$-3-ketosteroid has the formula:

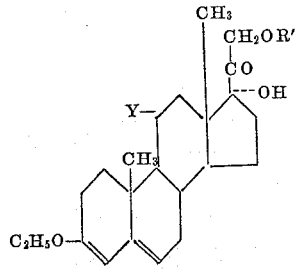

where $R^1$ is a member selected from the group consisting of hydrogen and an acyl group derived from a lower alkanoic acid and Y is a member selected from the group consisting of keto and β-hydroxy groups.

9. A process as claimed in claim 1 in which the starting ethyl ether of said $\Delta^4$-3-ketosteroid has the formula:

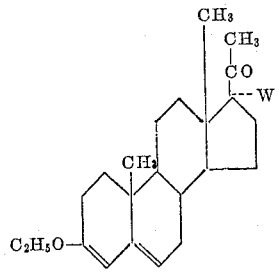

where W is a member selected from the group consisting of hydrogen, a hydroxy group and an acetoxy group.

10. A process as claimed in claim 1 in which the starting ethyl ether of said $\Delta^4$-3-ketosteroid has the formula:

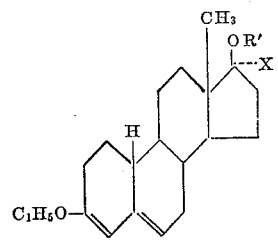

where $R^1$ is a member selected from the group consisting of hydrogen and an acyl group derived from a lower alkanoic acid and X is a member selected from the group consisting of methyl and ethynyl groups.

11. A process as claimed in claim 1 in which the starting ethyl ether of said $\Delta^4$-3-ketosteroid has the formula:

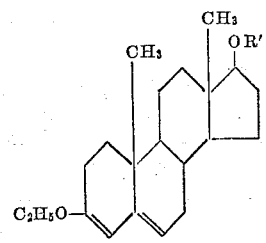

where $R^1$ is a member selected from the group consisting of hydrogen, an acyl group derived from an alkanoic acid containing 1-7 carbon atoms and a phenylpropionyl group.

No references cited.